United States Patent [19]

Prestidge et al.

[11] Patent Number: 5,499,194

[45] Date of Patent: Mar. 12, 1996

[54] METHOD FOR SCANNING THE SURFACE OF AN OBJECT

[75] Inventors: Tim Prestidge; Alexander T. Sutherland, both of Edinburgh, Scotland

[73] Assignee: Renishaw plc, Gloucestershire, England

[21] Appl. No.: 221,239

[22] Filed: Mar. 31, 1994

[30] Foreign Application Priority Data

Apr. 14, 1993 [GB] United Kingdom ............... 9307697

[51] Int. Cl.$^6$ ................................ G01B 5/004
[52] U.S. Cl. ............... 364/506; 364/571.02; 364/572; 395/128; 395/141
[58] Field of Search ..................... 364/506, 556, 364/559, 561, 562, 563, 571.01, 571.02, 572, 551.02, 474.03, 474.05; 382/58, 56, 60, 65, 1, 16, 19, 22, 25; 395/118, 119, 120, 128, 129, 133, 141

[56] References Cited

U.S. PATENT DOCUMENTS

| | | | |
|---|---|---|---|
| 4,453,267 | 6/1984 | Paganini et al. | 382/29 |
| 4,542,328 | 9/1985 | Poyet | 318/573 |
| 4,603,431 | 6/1986 | Grover et al. | 382/56 |
| 4,630,309 | 12/1986 | Karow | 382/56 |
| 4,718,105 | 1/1988 | Lipkie et al. | 382/56 |
| 4,724,525 | 2/1988 | Purcell et al. | 364/560 |
| 4,872,105 | 10/1989 | Mozayeny | 364/167.01 |
| 4,901,253 | 2/1990 | Iwano et al. | 364/522 |
| 4,958,293 | 9/1990 | Tanaka et al. | 364/474.03 |
| 4,979,224 | 12/1990 | Maiocco et al. | 382/8 |
| 5,094,538 | 3/1992 | Reedman et al. | 356/376 |
| 5,121,334 | 6/1992 | Riley et al. | 364/474.05 |
| 5,126,948 | 6/1992 | Mitchell et al. | 364/474.03 |
| 5,128,870 | 7/1992 | Erdman et al. | 364/474.05 |
| 5,167,313 | 12/1992 | Dobbins et al. | 194/317 |
| 5,208,763 | 5/1993 | Hong et al. | 364/551.02 |
| 5,226,175 | 7/1993 | Deutsch et al. | 395/119 |
| 5,267,332 | 11/1993 | Walch et al. | 382/55 |
| 5,343,402 | 8/1994 | Matsuura et al. | 364/474.03 |
| 5,359,511 | 10/1994 | Schroeder et al. | 364/413.28 |

FOREIGN PATENT DOCUMENTS

| | | |
|---|---|---|
| 0528541A1 | 2/1993 | European Pat. Off. . |
| WO91/20020 | 12/1991 | United Kingdom . |

OTHER PUBLICATIONS

FIDIA CNC Digitizing User's Manual, Software Version V6.2–V6.3, Edition Jan. 2, 1991, pp. 1–29.

*Primary Examiner*—Ellis B. Ramirez
*Assistant Examiner*—Patrick J. Assouad
*Attorney, Agent, or Firm*—Oliff & Berridge

[57] ABSTRACT

A workpiece surface 30 is digitized by scanning it with the stylus 8 of a scanning probe 5. Digitized coordinate data for many points P1–P6 on the workpiece surface are subjected to a filtering algorithm, in order to remove redundant data when the surface is relatively flat or planar. Top and bottom tolerance vectors TV0,BV0 are defined, starting from a first point P1 and lying at a given tolerance h above and below a second point P2. Next, a direct vector DV1 is defined between the point P1 and a third point P3. If the vector DV1 lies outside the tolerance band between the vectors TV0 and BV0, then point P2 is deemed to be required and is not filtered out. Otherwise, the data for point P2 is deemed to be redundant and is rejected. In this case, new tolerance vectors TV1 and BV1 are now defined, starting from point P1 and passing within a tolerance h above and below point P3. From the four vectors TV0,TV1,BV0,BV1, a pair of vectors TVn,BVn is selected for a further iteration of the process, based upon which of these vectors lies closest to the vector DV1.

25 Claims, 4 Drawing Sheets

METHOD FOR SCANNING THE SURFACE OF AN OBJECT

FIELD OF THE INVENTION

This invention relates to the measurement of an object by scanning its surface contour.

DESCRIPTION OF PRIOR ART

It is known to scan the surface contour of an object by mounting a suitable probe in a machine tool, coordinate measuring machine, or in a specialist scanning machine. The probe is scanned across the surface of the object, and a large number of readings of position coordinates are taken. This position coordinate data is then fed to a computer, and the process is known as digitisation.

One example of a scanning machine which can be used for such purposes is shown in our earlier European Patent Application EP 528541. One example of a scanning method for scanning an object having an unknown surface contour is shown in our International Patent Application WO 91/20020.

Such scanning methods generate large amounts of coordinate data, representing individual scanned points on the surface of the object. The computer stores all this data, for example on a magnetic disc, and it is subsequently processed further.

Prior to such further processing, it is known to filter the data, in order to remove redundant information and thus reduce the amount of processing required. In particular, much redundant data can be filtered out where a particular part of the object surface is flat or planar, since obviously less data is needed to describe such a surface than a rapidly changing contour.

SUMMARY OF THE INVENTION

The present invention relates to a method of scanning or digitising an object surface, in which a novel filtering algorithm is used. The preferred algorithm can be used as above, to filter data which has been stored prior to subsequent processing. Alternatively, however, the preferred algorithm can be used in real time to filter the data as it is generated, prior to storing it.

BRIEF DESCRIPTION OF THE DRAWINGS

A preferred embodiment of the invention will now be described with reference to the accompanying drawings, wherein.

DESCRIPTION OF PREFERRED EMBODIMENTS

Figure 1:
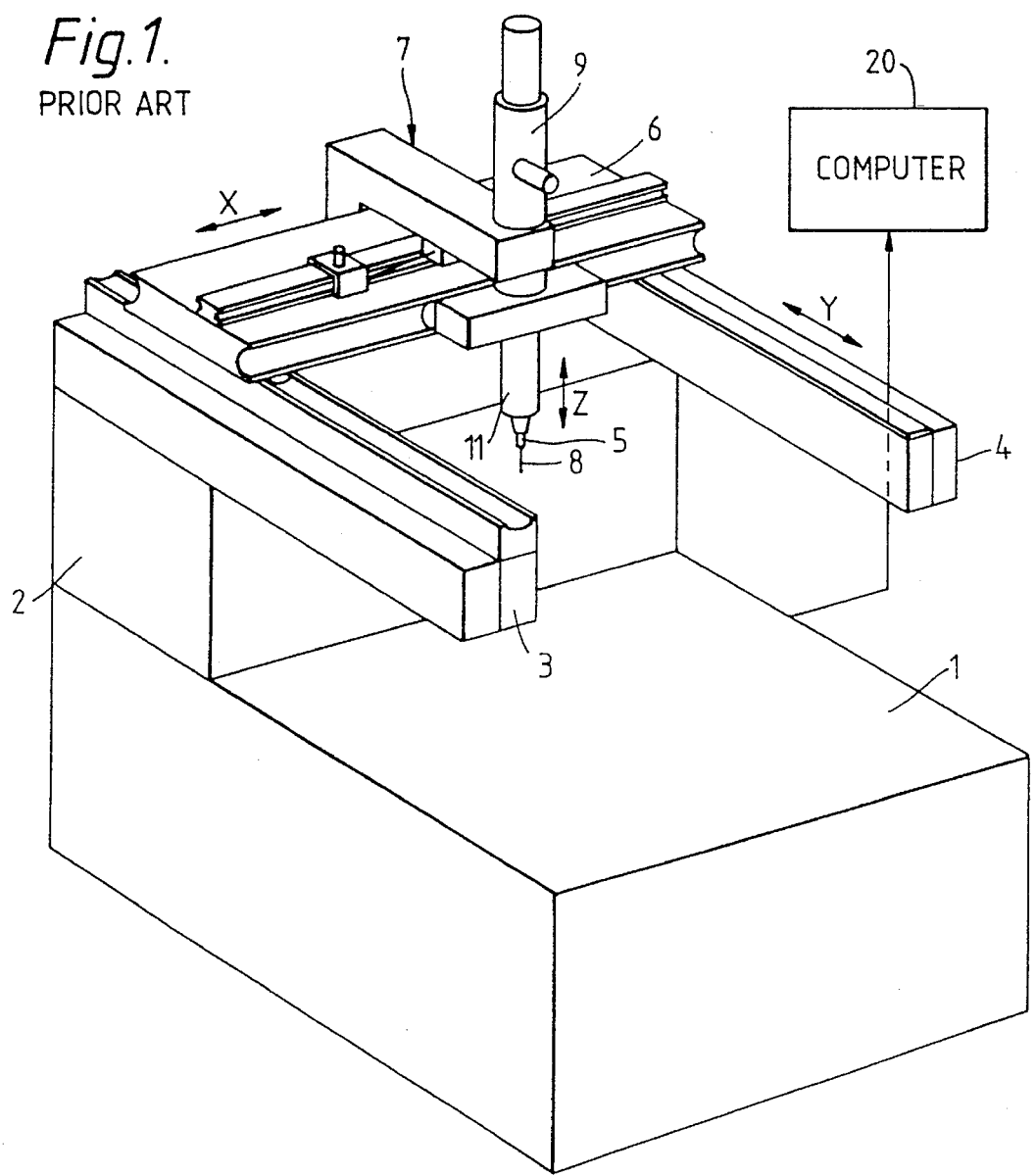
FIG. 1 shows a scanning machine with which the preferred method may be used.

FIG. 1 shows a scanning machine with which the preferred method according to the invention may be used. However, the method is of course equally applicable to other scanning machines, and to scanning methods performed on other machines such as coordinate measuring machines and machine tools.

The machine shown in FIG. 1 is generally as shown in our European Patent Application No. EP 528541, to which reference should be made for more detail. Briefly, the machine comprises a base 1, a pillar 2 upstanding from one end of the base, and two beams 3,4 which are positioned on top of the pillar. A bridge 6 can slide in a direction Y along the beams 3,4, while a carriage 7 can slide in a direction X along the bridge 6. The carriage 7 has a pillar 9 which supports a spindle 11 for movement in a vertical direction Z. At its lower end, the spindle 11 carries a probe 5, having a deflectable, object-contacting stylus 8.

The machine has conventional motor drives (not shown) for driving the bridge 6 in the Y direction on the beams 3,4, for driving the carriage 7 in the X direction on the bridge 6, and for driving the spindle 11 in the Z direction in the carriage. It also has scales or other transducers which indicate the X,Y,Z coordinate position of the probe 5 within the working volume of the machine.

For purposes of illustration, the probe 5 is assumed to be of the analogue type, containing further transducers which measure the deflection of the stylus 8 in the X,Y and Z directions when it is brought into contact with the surface of an object placed on the base 1. To measure the coordinate of a point on the surface, the outputs of these transducers are added to those of the scales. However, many other types of probe can be used, such as a touch trigger probe, which simply issues a trigger signal at the instant of contact between the object surface and the stylus, causing a coordinate reading to be taken from the scales. Alternatively, the probe may be a non-contact type, such as a laser triangulation probe.

In use, the motor drives are controlled by a program in a computer 20 so as to cause the probe 5 to scan the surface of an object placed on the base 1. There are a number of different ways in which the surface can be scanned, under the control of the computer 20.

Figure 2:
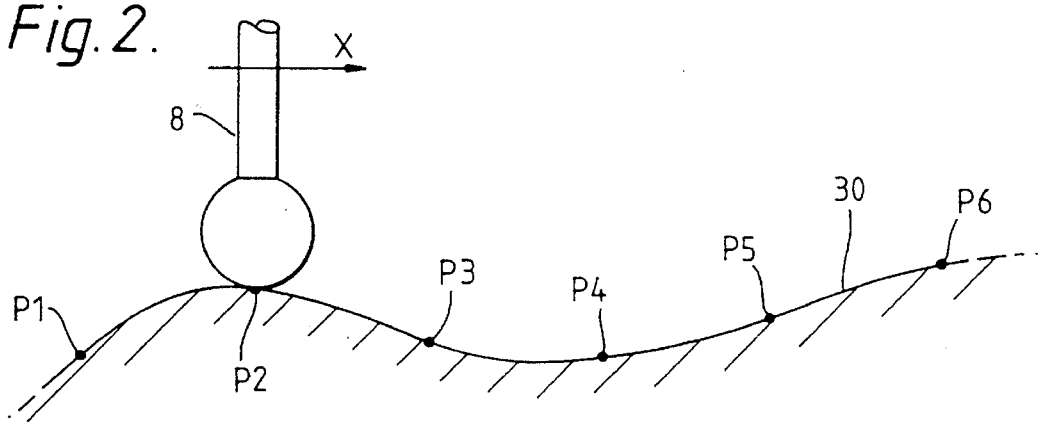
FIG. 2 is a schematic illustration of a probe stylus scanning the surface of an object.

For example, the stylus 8 can be scanned in the X direction along each of a series of lines, the lines each being slightly spaced in the Y direction to form an X-Y scanning raster. FIG. 2 shows the stylus scanning along one such line, over an object surface 30. It moves up and down in the Z direction as it does so, and the computer 20 takes a reading of the coordinate position at regular intervals. This builds up digitised coordinate data for a series of points P1–P6, and many other points, all lying within a single X–Z slice of the object. The result is a large amount of data which would conventionally be stored by the computer 20 in a file, prior to further processing, along with similar quantities of data for each of the other X–Z slices within the raster. For clarity, the spacing of points P1–P6 is exaggerated in FIG. 2; in reality the points are much closer together.

The raster scanning process may proceed along a predetermined path for the stylus 8, based upon the nominal shape of the object. Alternatively, it may use techniques designed for scanning a surface having an unknown shape, for example as in our earlier International Application WO 91/20020. Of course, the raster scanning may be turned through 90° if desired, so as to build up coordinate data for a series of slices in the Y–Z direction. With suitable scanning software, the slices of the scan may be oriented in any desired vertical plane.

The data acquired is subjected to a novel data filtering algorithm which will be described below. This filtering algorithm may be performed at a subsequent time, either in the computer 20 or on a separate computer, acting upon the file of coordinate data which has been acquired and stored. However, the filtering algorithm may instead be performed in real time by the computer 20 as the data is being acquired, and before it is stored. This latter possibility has the advantage of removing redundant data before storage, thereby reducing the storage requirements. If the computer 20 has storage of limited capacity, for example a magnetic disc, this enables data to be acquired from a given object at a density which would not otherwise be possible.

Figure 8:
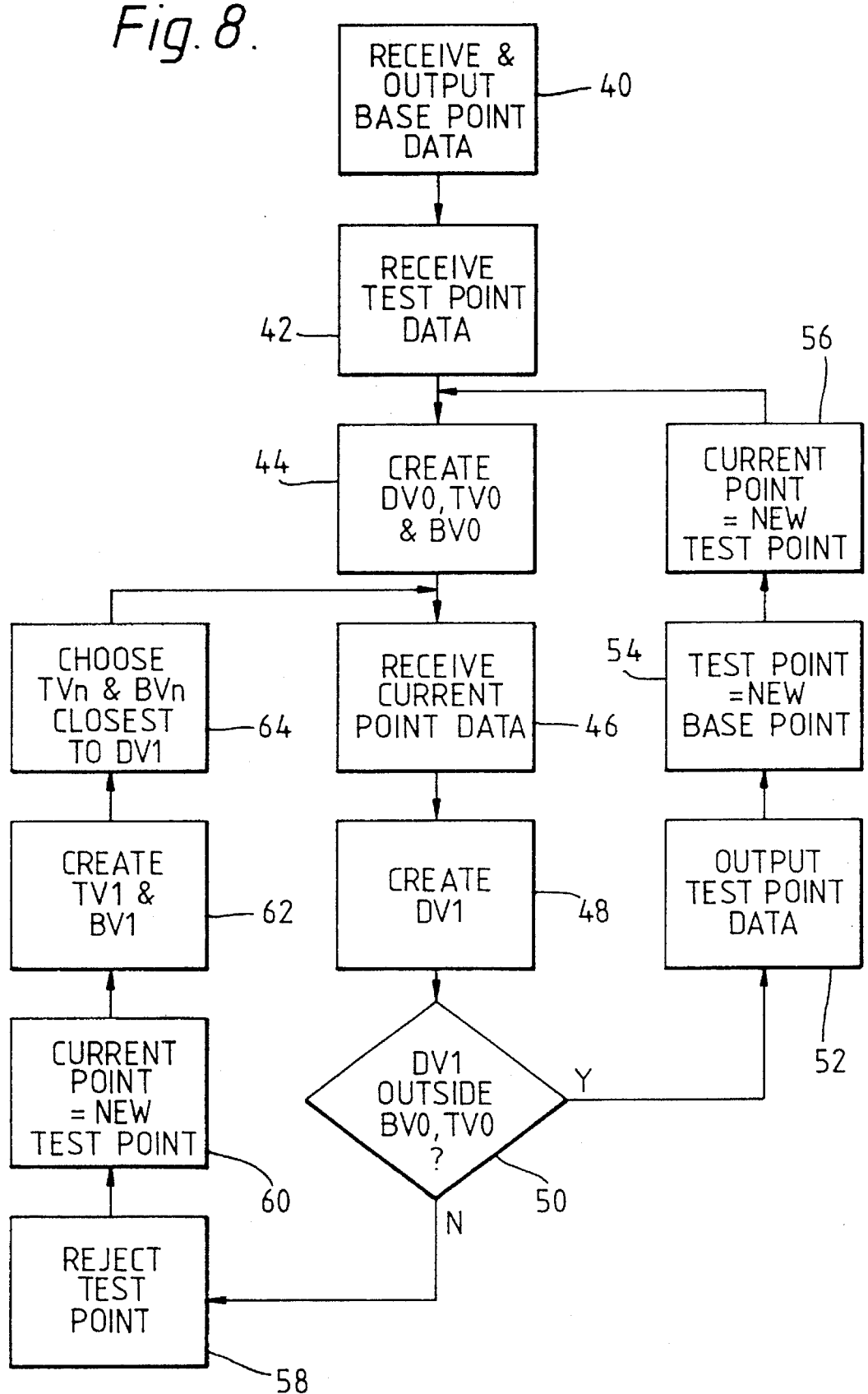
FIG. 8 is a flow chart of the algorithm.

The algorithm uses a tolerance value which is preset by the user, e.g. in response to a question asked by the computer 20 before the process commences. This tolerance value is known as the chordal tolerance value. For purposes of illustration, it is assumed that the coordinate data for the points P1–P6 in FIG. 2 is acquired, in that order. The algorithm proceeds in the following stages, receiving the coordinate data for the points in order, either directly as scanning takes place or from a file of data stored by the computer 20. The various stages are illustrated in FIGS. 3–6, which represent the data in the same X–Z plane as FIG. 2. The steps of the algorithm are also shown in FIG. 8.

STAGE 1

The algorithm receives coordinate data for the first point P1. This is referred to as a base point. It is automatically deemed to be a required point (i.e. it is not redundant) and it is therefore passed to the output of the algorithm. (Step 40 in FIG. 8.)

STAGE 2

Figure 3:
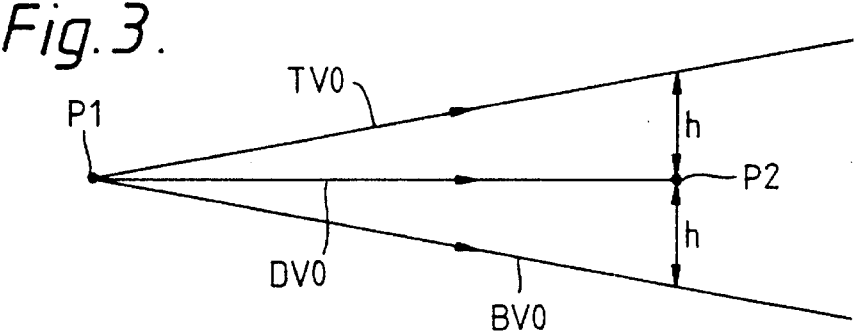
FIGS. 3–7 are diagrams showing points which have been scanned, to illustrate the application of a filtering algorithm to the data representing those points.

When the data for the second point P2 (called a test point) is received, the algorithm creates a direct vector DV0, a top tolerance vector TV0 and a bottom tolerance vector BV0, as shown in FIG. 3. (Steps 42 and 44 in FIG. 8.) The direct vector DV0 is simply the vector between the base point P1 and the test point P2. The top and bottom tolerance vectors TV0,BV0 are the vectors running from the base point P1 through points on either side of the test point P2, spaced from the test point P2 by a distance h. The distance h is simply half the value of the chordal tolerance input by the user.

STAGE 3

Figure 4:
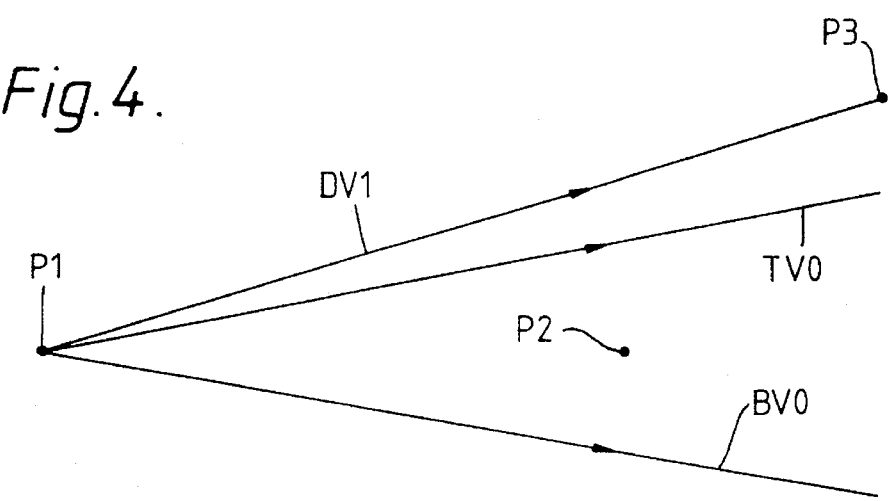
Figure 5:
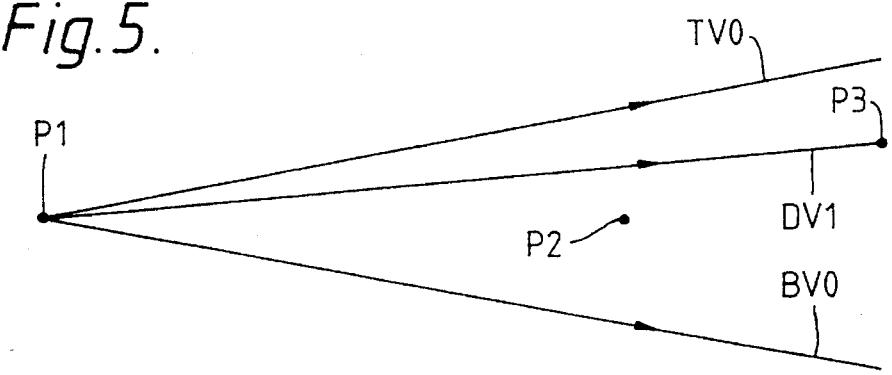

When the next point P3 is received (called the current point) a new direct vector DV1 is created running from the base point P1 through the current point P3. (Steps 46 and 48.) There are two possible conditions for the new vector DV1. Either it will lie outside the tolerance band bounded by the top and bottom tolerance vectors TV0,BV0 as illustrated in FIG. 4; or alternatively it will lie within that tolerance band as illustrated in FIG. 5. The algorithm determines which of these two cases has occurred by calculating the cross-product (vector product) of the new direct vector DV1 with each of the top and bottom tolerance vectors TV0,BV0 respectively. (Step 50.)

If it is determined that the new direct vector DV1 lies outside the tolerance band (FIG. 4) then the test point P2 is deemed to be required. The algorithm outputs the coordinate data for the test point P2 (step 52), after the coordinate data for the base point P1. The test point P2 is now treated as a new base point, and the current point P3 is treated as a new test point. (Steps 54 and 56.) The algorithm begins again from Stage 2, calculating new top and bottom tolerance vectors (TV0,BV0) based upon these new base and test points.

Should the new direct vector DV1 lie within the tolerance band between the top and bottom tolerance vectors TV0, BV0 (FIG. 5) then the test point P2 is rejected (i.e. filtered out) because it is deemed to be within the tolerance specifications of the algorithm. (Step 58.) That is, the test point P2 is redundant data which can be discarded because the surface contour is relatively flat or planar in this region. In this case, the algorithm retains the point P1 as its base point, and the current point P3 is re-defined as the new test point. (Step 60.) However, in this case the old tolerance vectors TV0, BV0 are not discarded.

Figure 6:
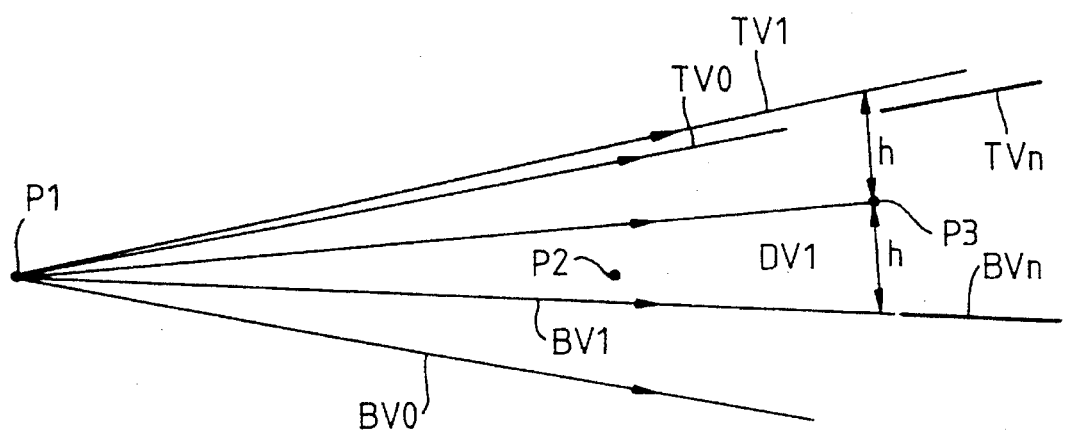

New top and bottom tolerance vectors TV1,BV1 are now set around the new test point P3. (Step 62.) As illustrated in FIG. 6, this is done in a similar manner to Stage 2 above, using the distance h derived from the chordal tolerance.

Next, the algorithm chooses two of the tolerance vectors TV0,BV0,TV1,BV1 with which to continue, always taking one top tolerance vector and one bottom tolerance vector. The pair chosen is selected on the basis of which two vectors are closest to the direct vector DV1, above and below it respectively. (Step 64.) Usually the chosen pair will comprise one vector from each of the old and new sets. In the example shown in FIG. 6 the new top vector TVn is the top vector TV0 from the old set, while the new bottom vector BVn is the bottom vector BV1 from the new set. However, it is occasionally possible, especially after several iterations, for both vectors to be chosen from the new set. It will be seen from FIG. 6 that the band of tolerance associated with the chosen vectors TVn,BVn is always less than or equal to the chordal tolerance 2h.

The algorithm next repeats step 46, to receive a new point P4 (see FIG. 2). The procedure from Stage 3 onwards is repeated, using P1 as the base point, P3 as the test point and P4 as the current point, and using the new tolerance vectors TVn,BVn to define the tolerance band.

Figure 7:
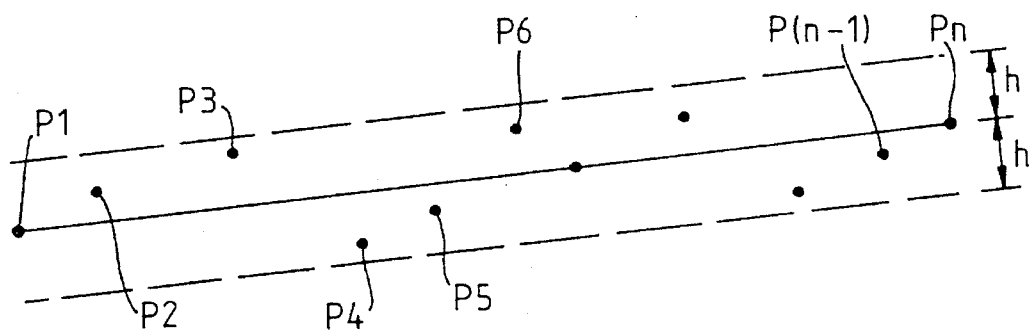

It will therefore be seen that whenever a data point is discarded, the tolerance requirements for each subsequent point become increasingly tight. As illustrated in FIG. 7, all discarded points P2 to P(n−1) are within the chordal tolerance of the straight line joining the two required points P1,Pn that bound them.

The algorithm can be used to reject unnecessary points entirely as it proceeds. Alternatively, it can just flag those points for action, so that they can be discarded at a later stage.

It is important to note that the algorithm uses only previous points to decide the fate of the current point. It does not need to know the behaviour of the whole set of points. For this reason, the algorithm is particularly suited for real time operation, deciding which points are required whilst the scan is under way. A further advantage is that the equations which must be calculated during the operation of the algorithm are simple, and involve only a few data points at a time. This is another reason why the algorithm lends itself to real time operation, and leads to improved speed and performance even if it is operating on a previously stored file of data. Moreover whilst many points can be discarded during operation, the vectors derived from discarded points may still be used to decide the fate of subsequent points, by narrowing the tolerance band, so that even discarded data can have an effect on the final result.

The algorithm described above is essentially two-dimensional, and is therefore suitable for scanned points which all lie within the same plane (e.g. the X–Z or Y–Z plane, as produced by the raster scanning operation described above). However, the algorithm can easily be extended to three dimensions where the data points are not all co-planar. This may be done by defining "cones of tolerance" in three dimensions, instead of the two-dimensional bands of tolerance illustrated in FIGS. 3–6. In FIG. 3, for example, the base point P1 will define the apex of the cone, and the direct vector DV0 will define its axis. Alternatively, to simplify the data processing, the two dimensional method described above may simply be repeated in the X-Y plane, so that there is a band of tolerance in the X-Y plane similar to that in the X–Z (or Y–Z) plane. It will be noted that the notional "cones of tolerance" just mentioned now become notional "pyramids of tolerance", with the base point P1 defining the apex of the pyramid and the horizontal and vertical tolerance distances 2h defining the size of the square (or rectangular) base of the pyramid.

We claim:

1. A method of digitising a surface of a workpiece comprising the steps of:

scanning the surface with a probe to produce a digitised coordinate data signal representing coordinates of a plurality of points on the workpiece surface; and filtering said coordinate data signal to reject portions of said coordinate data signal representing some of said points, wherein the filtering step comprises the steps of:

selecting portions of said coordinate data signal representing first, second and third points, produced in that order, on the surface, creating a vector extending from the first point through the third point, determining whether said vector lies within a predetermined tolerance distance from the second point, and removing the portion representing the second point from said coordinate data signal to reject the second point if said vector lies within said tolerance distance.

2. A method according to claim 1, wherein the step of determining whether said vector extending from the first point through the third point lies within said tolerance distance comprises:

creating a plurality of tolerance vectors, each extending from said first point through one of a plurality of tolerance points, each point located on a respective side of said second point, each tolerance point being spaced from said second point by a tolerance value to define a tolerance band between said tolerance vectors, and determining whether said vector extending from the first point through the third point lies within said tolerance band.

3. A method according to claim 2, further including the step of calculating the cross-products of the vector from the first point to the third point with each of said tolerance vectors.

4. A method according to claim 1, wherein, if the portion representing the second point is not rejected, the filtering step further comprises the steps of:

selecting another portion of said coordinate data signal representing a fourth point on the surface, creating a second vector extending from the second point through the fourth point, determining whether said second vector lies within the predetermined tolerance distance from the third point, and removing the portion representing the third point from said data signal to reject the third point if said second vector lies within said tolerance distance.

5. A method according to claim 1, wherein, if the portion representing the second point is removed from the coordinate data signal, the filtering step further comprises the steps of:

selecting another portion of said coordinate data signal representing a fourth point on the surface, creating a second vector extending from the first point through the fourth point, determining whether said second vector extending from the first point through the fourth point lies within the tolerance distance from the third point, and removing the portion representing the third point from said data signal to reject the third point if said vector from the first point to the fourth point lies within said tolerance distance from the third point.

6. A method according to claim 5, wherein said tolerance distance from the third point is determined by:

creating a plurality of first tolerance vectors, each extending from said first point through one of a plurality of first tolerance points, each point located on a respective side of the second point, each first tolerance point being spaced from the second point by a tolerance value, creating a plurality of second tolerance vectors, each extending from said first point through one of a plurality of second tolerance points, each point located on a respective side of the third point, each second tolerance point being spaced from the third point by a tolerance value and selecting one vector from each pair of first and second tolerance vectors located on a same side of the third point, each selected vector being a closest one of said pair of first and second tolerance vectors on the same side of the third point which is closest to the vector extending from the first point through the third point.

7. A method according to claim 1, in which said filtering step is performed concurrently with the scanning step.

8. A method according to claim 1, in which the portions of said coordinate data signal representing said points are stored in a memory device during the scanning step, and said filtering step is performed on the stored data subsequently to the scanning step.

9. A method of filtering a digitised coordinate data signal representing coordinates of a plurality of points on a surface of a workpiece, to filter portions of said coordinate data signal representing some of the points, comprising the steps of:

scanning the surface of the workpiece with a probe to generate the coordinate data signal, selecting portions of said coordinate data signal representing first, second and third points, produced in that order, on the surface, creating a vector extending from the first point through the third point, determining whether said vector lies within a predetermined tolerance distance from the second point, and filtering the portion representing the second point from said coordinate data signal to reject the second point if said vector lies within said tolerance distance.

10. A method according to claim 9, wherein the step of determining whether said vector extending from the first point through the third point lies within said tolerance distance comprises the steps of:

creating a plurality of tolerance vectors, each extending from said first point through one of a plurality of tolerance points, each tolerance point located on a respective side of said second point and spaced from said second point by a tolerance value to define a tolerance band between said tolerance vectors, and determining whether said vector extending from the first point through the third point lies within said tolerance band.

11. A method according to claim 10, further including the step of calculating the cross-products of the vector from the first point to the third point with each of said tolerance vectors.

12. A method according to claim 9, wherein, if the portion representing the second point is not rejected, the filtering step further comprises the steps of:

selecting another portion of said coordinate data signal representing a fourth point on the surface, creating a second vector extending from the second point through the fourth point, determining whether said second vector lies within the predetermined tolerance distance from the third point, and filtering the portion representing the third point from said data signal to reject the third point if said second vector lies within said tolerance distance.

13. A method according to claim 9, wherein, if the portion representing the second point is rejected, the filtering step further comprises the steps of:

selecting another portion of said coordinate data signal representing a fourth point on the surface, creating a second vector extending from the first point through the fourth point, determining whether said second vector extending from the first point through the fourth point lies within the tolerance distance from the third point, and filtering the portion representing the third point from said data signal to reject the third point if said vector extending from the first point through the fourth point lies within said tolerance distance from the third point.

14. A method according to claim 13, wherein said tolerance relative to the third point is determined by:

creating a plurality of first tolerance vectors, each extending from said first point through one of a plurality of first tolerance points, each first point located on a respective side of the second point, each first tolerance point being spaced from the second point by a tolerance value, creating a plurality of second tolerance vectors, each extending from said first point through one of a plurality of second tolerance points, each second point located on a respective side of the third point, each second tolerance point being spaced from the third point by a tolerance value, and selecting one vector from each pair of first and second tolerance vectors located on a same side of the third point, each selected vector being a closest one of said pair of first and second tolerance vectors on the same side of the third point which is closest to the vector extending from the first point through the third point.

15. A method for filtering a data signal generated by scanning the surface of a workpiece, comprising the steps of:

scanning the surface with a probe;

generating a data signal comprising a plurality of point position data signals, each point position data signal indicative of a position of a point of the surface relative to a predetermined coordinate system;

filtering the data signal to remove redundant ones of the plurality of point position data signals to form a filtered data signal; and storing the filtered data signal in a memory device;

wherein the filtering step comprises the steps of:

selecting a point corresponding to one of the plurality of point position data signals as a base point, selecting another point corresponding to another of the plurality of point position data signals as a test point, selecting another point corresponding to another of the plurality of point position data signals as a current point, the base, test and current points located in that order on the workpiece surface, generating a test vector extending from the base point through the current point, determining if the test vector lies within a selected tolerance distance extending from the test point, and filtering the point position data signal corresponding to the test point from the data signal as one of the redundant ones of the plurality of point position data signals when the test vector lies within the tolerance distance.

16. The method of claim 15, wherein:

the test vector determining step comprises the steps of:

determining a plurality of tolerance vectors extending from the base point, each tolerance vector spaced from the test point by a tolerance value distance, and determining if the test vector lies between the plurality of tolerance vectors; and the filtering step comprises the step of filtering out the point position data signal corresponding to the test point if the test vector lies between the plurality of tolerance vectors.

17. The method of claim 16, wherein the tolerance vector determining step comprises the steps of:

generating a base vector extending from the base point through the test point;

generating a plurality of tolerance distance vectors extending from the test point in directions perpendicular to the base vector, each tolerance distance vector having a magnitude equal to a tolerance value; and forming each tolerance vector as a vector sum of the base vector and a corresponding one of the tolerance distance vectors.

18. A method for filtering a data signal generated by scanning the surface of a workpiece, comprising the steps of:

placing the workpiece within a measuring space of a machine having a probe and a plurality of axis measuring devices, each axis measuring device generating a coordinate signal indicating a distance of the surface from an origin position along an independent axis;

scanning the surface with the probe;

generating a data signal comprising a plurality of point position data signals, each point position data signal indicative of a position of a point of the surface relative to a predetermined coordinate system and comprising a plurality of the coordinate signals from the plurality of axis measuring devices;

filtering the data signal to remove redundant ones of the plurality of point position data signals to form a filtered data signal; and storing the filtered data signal in a memory device;

wherein the filtering step comprises the steps of:

selecting a point corresponding to one of the plurality of point position data signals as a base point, selecting another point corresponding to another of the plurality of point position data signals as a test point, selecting another point corresponding to another of the plurality of point position data signals as a current point, the base, test and current points located in that order on the workpiece surface, generating a test vector extending from the base point through the current point, determining if the test vector lies within a selected tolerance distance extending from the test point, and filtering the point position data signal corresponding to the test point from the data signal as one of the redundant ones of the plurality of point position data signals when the test vector lies within the tolerance distance.

19. The method of claim 1, further comprising the step of placing the workpiece within a measuring space of a machine, the machine comprising the probe and a plurality of axis measuring devices, each axis measuring device generating a coordinate signal indicating a distance of the surface from an origin position along an independent axis, wherein the coordinate data signal comprises, for each of the plurality of points, a plurality of the coordinate signals from the plurality of axis measuring devices.

20. The method of claim 9, further comprising the step of placing the workpiece within a measuring space of a machine, the machine comprising the probe and a plurality of axis measuring devices, each axis measuring device generating a coordinate signal indicating a distance of the surface from an origin position along an independent axis, wherein the coordinate data signal comprises, for each of the plurality of points, a plurality of the coordinate signals from the plurality of axis measuring devices.

21. A method of digitizing a surface of a workpiece, comprising the steps of:

scanning the surface with a probe to produce a digitized coordinate data signal representing coordinates of a plurality of points on the workpiece surface; and filtering said coordinate data signal to reject portions of said coordinate data signal representing some of said points, wherein the filtering step selects portions of said coordinate data signal representing respective points on the workpiece surface in consecutive order and comprises steps of:

(a) selecting portions of said coordinate data signal which represent first and second points on the surface, in that order, the first point being defined as a base point and the second point as a test point;

(b) creating a tolerance band which is defined in dependence on the base and test points;

(c) selecting a next portion from said coordinate data signal which represents a next point on the surface, said next point defined as a current point;

(d) determining whether the current point lies within said tolerance band;

(e) removing the portion of said coordinate data signal representing the test point and redefining the current point as a new test point if the current point does lie within said tolerance band, and redefining the test point as a new base point and the current point as a new test point if the current point does not lie within said tolerance band; and (f) repeating steps (b) through (e) for the remaining portions of said coordinate data signal, using points as redefined in step (e).

22. A method according to claim 21, wherein in step (b) the tolerance band is created by creating a plurality of tolerance vectors, each extending from said base point through a respective tolerance point on a respective side of said test point, each tolerance point being spaced from said test point by a tolerance value.

23. A method according to claim 21, wherein step (d) comprises steps of:

creating a vector extending from said base point through said current point, and determining whether said vector lies within said tolerance band.

24. A method according to claim 21, wherein step (e) further includes the step of outputting the portion of the coordinate data signal representing the test point, if the current point does not lie within said tolerance band.

25. A method according to claim 24, wherein the outputting step is performed concurrently with the scanning of the surface with the probe.

* * * * *